US011788234B2

(12) United States Patent
Dembrosky et al.

(10) Patent No.: US 11,788,234 B2
(45) Date of Patent: Oct. 17, 2023

(54) LOW-SHEDDING ARAMID PAPER CONTAINING MICA

(71) Applicant: DUPONT SAFETY & CONSTRUCTION, INC., Wilmington, DE (US)

(72) Inventors: Chris Dembrosky, Richmond, VA (US); Roger Curtis Wicks, South Chesterfield, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 17/867,193

(22) Filed: Jul. 18, 2022

(65) Prior Publication Data

US 2023/0052674 A1    Feb. 16, 2023

Related U.S. Application Data

(60) Provisional application No. 63/228,811, filed on Aug. 3, 2021.

(51) Int. Cl.
  *D21H 27/38*  (2006.01)
  *D21H 13/26*  (2006.01)
  *D21H 17/68*  (2006.01)

(52) U.S. Cl.
  CPC ............ *D21H 27/38* (2013.01); *D21H 13/26* (2013.01); *D21H 17/68* (2013.01)

(58) Field of Classification Search
  CPC ......... D21H 27/38; D21H 13/26; D21H 17/68
  See application file for complete search history.

(56) References Cited

U.S. PATENT DOCUMENTS

| | | | |
|---|---|---|---|
| 3,063,966 A | 11/1962 | Kwolek et al. | |
| 3,227,793 A | 1/1966 | Cipriani | |
| 3,287,324 A | 11/1966 | Sweeny | |
| 3,414,645 A | 12/1968 | Morgan, Jr. | |
| 4,481,060 A | 11/1984 | Hayes | |
| 5,667,743 A | 9/1997 | Tai et al. | |
| 6,312,561 B1 | 11/2001 | Forsten et al. | |
| 6,991,845 B2 | 1/2006 | Levit et al. | |
| 7,399,379 B2 | 7/2008 | Levit et al. | |
| 9,073,290 B2 | 7/2015 | Levit et al. | |
| 9,437,348 B2 | 9/2016 | Turpin et al. | |
| 9,844,928 B2 | 12/2017 | Duart et al. | |
| 9,972,419 B2 | 5/2018 | Kang | |
| 10,186,353 B2 | 1/2019 | Kang et al. | |
| 10,336,039 B2 | 7/2019 | Kang et al. | |
| 10,457,013 B2 * | 10/2019 | Kawka | H01M 50/423 |
| 2004/0115422 A1 * | 6/2004 | Levit | C08J 5/04 428/323 |
| 2009/0155526 A1 * | 6/2009 | Levit | B32B 3/12 428/116 |
| 2010/0122769 A1 | 5/2010 | Levit | |
| 2013/0196161 A1 | 8/2013 | Kang et al. | |
| 2013/0263385 A1 * | 10/2013 | Mora | D04H 1/4209 8/115.68 |
| 2014/0113104 A1 * | 4/2014 | Rozant | D21H 13/36 428/116 |
| 2016/0365173 A1 * | 12/2016 | Kang | B32B 5/022 |
| 2017/0320298 A1 * | 11/2017 | Kang | B32B 5/16 |

FOREIGN PATENT DOCUMENTS

| | | |
|---|---|---|
| GB | 1129097 A | 10/1968 |
| WO | 2015/195358 A1 | 12/2015 |
| WO | 2017/004187 A1 | 1/2017 |
| WO | 2020/163847 A1 | 8/2020 |

OTHER PUBLICATIONS

PCT International Search Report for Application No. PCT/US2022/073140; Philippe Ponsaud, Authorized Officer; ISA/EPO; dated Oct. 10, 2022.

* cited by examiner

*Primary Examiner* — Anthony Calandra
*Assistant Examiner* — Stephen M Russell

(57) ABSTRACT

An aramid paper suitable for use as electrical insulation comprising a first outer layer and a second outer layer, each of which comprising 70 to 30 weight percent aramid floc and 30 to 70 weight percent aramid fibrids, and each of which being free of mica and having a first face and a second face; an inner layer comprising 50 to 70 weight percent aramid material and 30 to 50 weight percent mica and having a first face and a second face; wherein the first face of the first outer layer is a first outer face of the aramid paper, and the second face of the first outer layer is coextensive with and bound face-to-face with the first face of the inner layer solely by fibrids in the first outer layer and the inner layer; and wherein the first face of the second outer layer is coextensive with and bound face-to-face with the second face of the inner layer solely by fibrids in the second outer layer and the inner layer, and the second face of the second outer layer is a second outer face of the aramid paper; the aramid paper having a total of 25 to 40 weight percent mica.

12 Claims, No Drawings

LOW-SHEDDING ARAMID PAPER CONTAINING MICA

BACKGROUND OF THE INVENTION

The present invention relates to an aramid paper suitable for use, without limitation, as electrical insulation in such things as motors, generators, transformers, and inverters.

U.S. Pat. No. 9,437,348 to Turpin et al. discloses a nonwoven paper layer directly fused on one or both sides with a nonwoven fabric layer wherein one or both of the nonwoven paper and nonwoven fabric are electrically insulating; the nonwoven fabric is a sheet material primarily comprised of long fibers, i.e. fibers greater than or equal to one inch long.

Various patent publications disclose the use of mica in aramid papers. Such publications include U.S. Pat. Nos. 6,991,845; 7,399,379; and 9,073,290 to Levit et al.; U.S. Pat. No. 6,312,561 to Forsten et al.; U.S. Pat. Nos. 10,336,039 and 10,186,353 and U.S. Patent Publication 20130196161 to Kang et al.; U.S. Pat. No. 9,972,419 to Kang; and U.S. Pat. No. 9,844,928 to Duart et al.

The crystalline structure of mica provides a material that superior electrical properties as an insulator; it has a high dielectric breakdown, is thermally stable to 500° C. (932° F.), is resistant to corona discharge, and even in small particles maintains its electrical properties.

The presence of mica a paper, however, can decrease the mechanical strength and cohesiveness of the paper. However, combining mica paper with a nonwoven fabric, film, or glass scrim support for increased mechanical performance is not desirable as this requires an additional step and various adhesives, etc.; and can increase the thickness of the paper, reduce electrical performance, or create other issues such as chemical compatibility with motor cooling fluids. Further, the industry desires any improved papers to be drop-in replacements for the very thin electrical insulation papers used today.

In addition, today the making of motors and associated devices is generally automated, using machines that rapidly and automatically inserts electrical insulation into slots and other motor areas where the potential exists for the electrical insulation to buckle or fall apart due to abrasion between the motor components and the electrical insulation. It has been found that in such processes this abrasion can cause papers containing mica to shed mica particulates from the paper, creating a dusting problem.

Therefore, what is needed is an aramid paper comprising mica that has adequate strength and also has good resistance to particle shedding.

BRIEF SUMMARY OF THE INVENTION

This invention relates to an aramid paper suitable for use as electrical insulation, comprising:
a) a first outer layer comprising 70 to 30 weight percent aramid floc and 30 to 70 weight percent aramid fibrids, the first outer layer being free of mica and having a first face and a second face;
b) an inner layer comprising 50 to 70 weight percent aramid material and 30 to 50 weight percent mica, the inner layer having a first face and a second face; and
c) a second outer layer comprising 70 to 30 weight percent aramid floc and 30 to 70 weight percent aramid fibrids the second outer layer being free of mica and having a first face and a second face;

wherein the first face of the first outer layer is a first outer face of the aramid paper, and the second face of the first outer layer is coextensive with and bound face-to-face with the first face of the inner layer solely by fibrids in the first outer layer and the inner layer; and wherein the first face of the second outer layer is coextensive with and bound face-to-face with the second face of the inner layer solely by fibrids in the second outer layer and the inner layer, and the second face of the second outer layer is a second outer face of the aramid paper; the aramid paper having a total of 25 to 40 weight percent mica.

DETAILED DESCRIPTION OF THE INVENTION

This invention relates to an aramid paper suitable for use as electrical insulation comprising a first outer layer and a second outer layer, each of which comprises 70 to 30 weight percent aramid floc and 30 to 70 weight percent aramid fibrids, each of which further is free of mica ("mica-free") and having a first face and a second face; an inner layer sandwiched between the first and second outer layers and comprising 50 to 70 weight percent aramid material and 30 to 50 weight percent mica and also having a first face and a second face. The first face of the first outer layer is a first outer face of the aramid paper, and the second face of the first outer layer is coextensive with, and bound face-to-face with, the first face of the inner layer solely by fibrids in the first outer layer and the inner layer. Likewise, the first face of the second outer layer is coextensive with, and bound face-to-face with, the second face of the inner layer solely by fibrids in the second outer layer and the inner layer, the second face of the second outer layer being the second outer face of the aramid paper. The aramid paper formed from the three-layer construction of (mica-free outer layer/mica-containing inner layer/mica-free outer layer) further has a total of 25 to 40 weight percent mica.

The mica-free outer layer, the mica-containing inner layer, and the mica-free outer layer are solely bound to each other by aramid fibrids present at the face of each layer. The fibrids are distributed homogeneously in each of the layers, with a portion of the fibrids being present at the surface of each layer; that is, the fibrids are present at both faces of each layer. Therefore, the fibrids are available at the surface of each layer to create intimate contact between the layers and bind or fuse the faces of two layers together when the layers are compressed together under elevated heat and pressure. This compression or consolidation can be accomplished in a static heated press or a set of calender rolls that form a nip, in a process that can compress or consolidate the sheet at a temperature that is at or above the glass transition temperature of the fibrids. The use of fibrids in the various layers for binding the layers together eliminates the need for additional adhesives or other binders that not only require a separate step to apply but can also be chemically incompatible with motor cooling and other fluids that the electrical insulation may be exposed to while in use.

By aramid paper, as used herein, it is meant a planar sheet made from plies or layers of aramid materials that are prepared by paper-making processes. Representative devices and machinery that can be used to make plies or layers include continuous-processing equipment such as, for example without limitation to, a Fourdrinier or inclined wire machine, or batch-processing equipment such as those that make paper by hand in a hand-sheet mold containing a forming screen. Specifically, the aramid paper is planar sheet comprising a mica-containing aramid layer having a first and second opposing planar surfaces, and each of the first and second opposing planar surfaces has attached thereto a mica-free aramid layer. Therefore, the aramid paper can consist of mica-free aramid outer layer, a mica-containing aramid inner layer, and a mica-free aramid outer layer, attached together in that order.

The aramid paper consisting of the mica-free aramid layer, mica-containing aramid layer, and mica-free aramid layer, attached together in that order, has a total of 25 to 40 weight percent mica, based on the total weight of mica in the total weight of the aramid paper. It is believed that if the amount of mica in the aramid paper is less than 25 weight percent, the measured partial discharge initiation voltage of the aramid paper will be too low for many applications. The partial discharge initiation voltage (PDIV) of the paper is the level of applied voltage that begins localized dielectric breakdown in the paper. Therefore, the partial discharge initiation voltage (PDIV) and partial discharge initiation voltage per unit thickness (PDIV/mil) are important properties because higher values are desired and lower values mean that there can be rapid degradation of the insulation material in use, which can result in lower insulation life and/or insulation failure. Likewise, if the amount of mica in the aramid paper is greater than 40 weight percent the paper mechanical properties can be reduced to a point that the aramid material would not be suitable for many desired uses.

In some other embodiments, the aramid paper consisting of the mica-free aramid layer, mica-containing aramid layer, and mica-free aramid layer, attached together in that order, has a total of 30 to 40 weight percent mica, based on the total weight of mica in the total weight of the aramid paper. In some still other embodiments, the aramid paper consisting of the mica-free aramid layer, mica-containing aramid layer, and mica-free aramid layer, attached together in that order, has a total of 35 to 40 weight percent mica, based on the total weight of mica in the total weight of the aramid paper.

The aramid material can include aramid floc. The term "floc", as used herein, means fibers that are cut to a short length and that are customarily used in the preparation of papers. Typically, floc has a length of from about 3 to about 20 millimeters. A preferred length is from about 3 to about 7 millimeters. Floc is normally produced by cutting continuous fibers into the required lengths using well-known methods in the art.

The term "aramid", as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide) (MPD-I). U.S. Pat. Nos. 3,063,966; 3,227,793; 3,287,324; 3,414,645; and 5,667,743 are illustrative of useful methods for making aramid fibers that could be used to make aramid floc.

The aramid material can include aramid fibrids. The term "fibrids", as used herein, means very small, nongranular, fibrous or film-like particles with at least one of their three dimensions being of minor magnitude relative to the largest dimension. These particles are prepared by precipitation of a solution of polymeric material using a non-solvent under high shear. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly (meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

The aramid paper has a first outer layer or ply comprising 70 to 30 weight percent aramid floc and 30 to 70 weight percent aramid fibrids, the first outer layer being free of mica and having a first face and a second face. Likewise, the aramid paper has a second outer layer or ply comprising 70 to 30 weight percent aramid floc and 30 to 70 weight percent aramid fibrids, the second outer layer being free of mica and having a first face and a second face. It is believed these weight ranges will produce the best mechanical properties for the final aramid paper. Mechanical strength is needed so that the aramid paper will not buckle or fall apart during automatic insertion in devices such as slot liners in electrical motors. Additionally, it is thought these weight range are needed to provide the desired abrasion resistance of the paper during use. The first and second outer layers work synergistically in the aramid paper to not only eliminate mica shedding by covering the layer or ply containing the mica, but also by having the mechanical stability to avoid damaging of the paper during use, which would release mica particles.

In some embodiments, the first outer layer and the second outer layer of the aramid paper each comprise 60 to 40 weight percent aramid floc and 40 to 60 weight percent aramid fibrids. In some preferred embodiments, the first outer layer and the second outer layer of the aramid paper each comprise 50 to 40 weight percent aramid floc and 50 to 60 weight percent aramid fibrids. In some embodiments, the first outer layer and the second outer layer of the aramid paper have the same composition. In still other embodiments, the first outer layer and the second outer layer of the aramid paper consist of only a mixture of aramid floc and aramid fibrids.

The term "layer", preferably refers to a thin planar material made on a paper machine in the form of a formed web. In most papermaking, an aqueous dispersion containing the desired paper composition is supplied to a screen, where the solid materials in the dispersion form a wet laid web, or what is sometimes known as a waterleaf, and the water is removed by gravity, vacuum, and/or pressing. The wet laid web, when dried, becomes a "formed web" as used herein. In the art, this formed web is sometimes also referred to as a "ply" or a dried waterleaf. Therefore, as used herein, the term "layer" preferably refers to a formed web, ply, or dried waterleaf, the terms being used interchangeably. Also, as used herein, the term "face" refers to either of the two major surfaces of the layer (i.e., one side or the other of the layer).

In one embodiment, each of the first and second outer layers has a thickness of 0.001 to 0.003 inches (1 to 3 mils); and in a preferred embodiment each of the first and second outer layers has a thickness of 0.0015 to 0.002 inches (1.5 to 2 mils).

The aramid paper also has an inner layer or ply comprising 50 to 70 weight percent aramid material and 30 to 50 weight percent mica, the inner layer having a first face and a second face. In some embodiments, the aramid material of the inner layer is a combination of less than 50 weight percent aramid floc and greater than 50 weight percent aramid fibrids. In some specific embodiments, the aramid material of the inner layer is a combination of 15 to 45 weight percent floc and 55 to 85 weight percent fibrids.

The mica is normally used in the form of a flake and can be of various types, such as muscovite or phlogopite or blends thereof; however, mica of the muscovite type is preferred.

It is believed the properties of final laminate structure will be negatively impacted that if the mica-containing inner layer has more than 50 weight percent mica. First, on a constant weight basis, the tensile strength of the layer decreases as the amount of mica in that layer increases. Second, it is believed that having 50 weight percent mica or less in the mica-containing inner layer discourages bridging of the mica in the layer, which encourages the mica to be distributed throughout the layer. Further, it is believed that if the mica-containing inner layer has less than 30 weight percent mica, there is not enough mica present in that layer to provide the desired electrical properties.

In one embodiment, the mica-containing inner layer has a thickness of 0.002 to 0.010 inches (2 to 10 mils); and in a preferred embodiment the inner layer has a thickness of 0.004 to 0.006 inches (4 to 6 mils).

The first face of the first outer layer is a first outer face of the aramid paper, and the second face of the first outer layer is coextensive with and bound face-to-face with the first face of the inner layer solely by fibrids in the first outer layer and the inner layer. Likewise, the first face of the second outer layer is coextensive with and bound face-to-face with the second face of the inner layer solely by fibrids in the second outer layer and the inner layer, and the second face of the second outer layer is a second outer face of the aramid paper.

The phrase "coextensive with and bound face-to-face" preferably means that each outer layer and the inner layer have the same planar boundaries; the edges of the outer layer and the inner layer are the same with no extension of either outer layer past the edge of the inner layer, or vice versa.

The phrase "bound face-to-face" preferably means each opposing face of the inner layer is bound to one face of each of the outer layers. In some embodiments, the faces are homogeneously bound, meaning that the attachment of each face of the inner layer to a face of each outer layer is substantially uniform across the planar face. By substantially uniform, it is meant the layers are bound without any visual gaps in the attachment or visually-detectable discrete regions of non-attachment. In some embodiments, the faces are continuously bound, meaning the entire surface of each face of the inner layer is attached to the entire surface of one of the faces of an outer layer.

The aramid paper can be made in a batch manner comprising a number of steps, or more preferably in a continuous or semi-continuous manner by combining the two outer mica-free layers (or plies) with the inner mica-containing layer (or ply) using the manufacturing techniques and conditions such as described in British Patent GB 1,129,097; U.S. Patent Application Publication 2010/0122769, and U.S. Pat. No. 4,481,060.

In some embodiments, the aramid paper consisting of the mica-free aramid layer, mica-containing aramid layer, and mica-free aramid layer, attached together in that order, has a total thickness of 0.004 to 0.016 inches (4 to 16 mils). In some embodiments, particularly suitable for use in many high voltage (600-800 volts) the aramid paper has a total thickness of 0.007 to 0.012 inches (7 to 12 mils); preferably a total thickness of 0.008 to 0.010 inches (8 to 10 mils). In some other embodiments, for example for applications where the voltage requirement may be less, the aramid paper has a total thickness of 0.004 to 0.007 inches (4 to 7 mils).

In addition, as long as the aramid paper consisting of the first mica-free aramid outer layer, mica-containing aramid inner layer, and second mica-free aramid outer layer, attached together in that order, has a total thickness of 0.004 to 0.016 inches (4 to 16 mils), and the mica-containing inner layer has a thickness of 0.002 to 0.010 inches (2 to 10 mils), the mica-containing aramid inner layer can be formed from two or more mica-containing aramid sub-plies or sub-layers, preferably two or more identical mica-containing aramid sub-plies or sub-layers. Likewise, as long as the aramid paper consisting of the first mica-free aramid outer layer, mica-containing aramid inner layer, and second mica-free aramid outer layer, attached together in that order, has a total thickness of 0.004 to 0.016 inches (4 to 16 mils), and each of the first and second mica-free aramid outer layers has a thickness of 0.001 to 0.003 inches (1 to 3 mils), each of the mica-free aramid outer layers can be formed from two or more mica-free aramid sub-plies or sub-layers, preferably two or more identical mica-free aramid sub-plies or sub-layers. Preferably, the aramid paper is made by combining all the individual layers, and/or any sub-plies or sub-layers (if present) and then consolidating all the layers together at one time.

The aramid paper consisting of the mica-free aramid layer, a mica-containing aramid layer, and a mica-free aramid layer, attached together in that order, provides a structure that effectively shields the relatively weak mica-containing inner layer by use of the durable mica-free outer layers, preventing damage to the inner layer and the associated shedding of mica during installation of the aramid paper into the various devices in which is it used. The shedding of the aramid paper can be simulated using a Taber abrader, which continuously works the surface of the paper for a number of cycles, mimicking the abrasion of the surface in use by automated equipment. The mica-free outer layers protect the mica-containing inner layers so well that in some embodiments, when the aramid paper is subjected to a Taber abrasion measurement after 125 cycles using 1000 g weights on each of the arms (using a Taber 5150 Abraser (Abrader) and H018 wheels from Taber Industries, Tonawanda, N.Y.), the aramid paper has a weight loss in grams that is no more than the weight loss of a similarly tested mica-free aramid paper of the same thickness. Therefore, the aramid paper containing a considerable amount of mica (25 to 40 weight percent) unexpectantly has the shedding performance similar to that of a mica-free sheet.

TEST METHODS

Thickness was measured using ASTM-D374 (2010).
Partial Discharge Initiation Voltage (PDIV) was measured by ASTM-D1868 (2020).
Partial Discharge Initiation Voltage per thickness (PDIV/mil) was calculated by dividing Partial Discharge Initiation Voltage (PDIV) by the thickness (mil) of specified example.
Tensile Strength was measured by ASTM-D828 (2010).
Taber Abrasion was measured on the Taber 5150 Abraser in accordance with its use instructions (https://www.taber-industries.com/taber-rotary-abraser). The settings for paper measurement used H-18 abrasive wheels and 1000 g weights on each of the arms and ran for 125 cycles in each sample. The weight of the samples, both before and after the testing (which did not include any loose surface particles), was used to calculate the weight loss of the sample.

Example 1

An aramid paper consisting on two outer mica-free web layers having a single mica-containing inner web layer was made as follows.

To make the mica-free layers or plies, a mixture of 55 weight percent poly (m-phenylene isophthalamide) (MPD-I) fibrids and 45 weight percent crystallized MPD-I floc was made in water to form an aqueous dispersion suitable as a furnish for papermaking. The MPD-I fibrids were made as generally described in U.S. Pat. No. 3,756,908 and the MPD-I floc had a linear density 0.22 tex and a length of 0.64 cm. The dispersion was supplied to the headbox of a Fourdrinier paper machine and a wet laid web or waterleaf was formed. The wet laid web was then dried to form an unconsolidated mica-free aramid formed web or layer having a thickness of 2 mils (0.002 inches). The speed of the paper machine was then slowed to make a similar formed web or layer having a thickness of 3 mils (0.003 inches).

To make the mica-containing layers or plies, a mixture of 48 weight percent muscovite-type mica, 37 weight percent (MPD-I) fibrids and 15 weight percent crystallized MPD-I floc was made in water to form a mica-containing aqueous dispersion suitable as a furnish for papermaking. The MPD-I fibrids and the MPD-I floc were the same as used in the mica-free layers. The mica-containing dispersion was supplied to the headbox of a Fourdrinier papermaking machine and a wet laid web was formed. The wet laid web was then dried to form an unconsolidated mica-containing aramid formed web or layer having a thickness of 3 mils (0.002 inches). The speed of the paper machine was then slowed to make similar mica-containing formed webs or layers having thicknesses of 4 mils (0.004 inches), 6 mils (0.006 inches), 8 mils (0.008 inches), and 9 mils (0.009 inches).

To illustrate shedding potential, a sample of aramid paper consisting on two outer mica-free web layers having a single mica-containing inner web layer sandwiched between those two outer layers was made. Specifically, the aramid paper was made by laying up the various layers by hand and consolidating the three layers together in a heated static press operating at a surface temperature of 280° C. and pressing the layers together at a pressure of 500 psi.

The properties of the resulting 3-layer aramid paper are summarized in Table 1 under Item 1. Also shown in Table 1 are three Comparative Samples A, B, & C. Sample A was a two-layer paper having only two of the 3 mil mica-free web layers and no mica-containing web layer. Sample B was a three-layer paper having three of the 3 mil mica-free web layers and no mica-containing web layer. Sample C was a paper made with only one thick mica-containing formed web or layer; no mica-free layers are present.

The samples were submitted for Taber Abrasion testing to determine the potential amount of shedding. After 125 cycles, the samples were shaken to remove any loose surface particles. The sample was then weighed and compared to the sample weight before testing to determine the grams of material lost from the paper during the 125 cycles.

As shown, the Comparative aramid paper samples A & B, having no mica, shed very little, having a particulate matter of 0.19 and 0.09 grams, respectively; and obviously this was aramid fibrous material as no mica was present. The Inventive aramid paper sample of Item 1 had a similar level of particulate matter of 0.15 indicating essentially no mica was shed from this paper. Comparative aramid paper samples C & D illustrate the high level of particulates that were shed from mica-containing papers that did not have the outer protective layers.

TABLE 1

| Item | Starting Layer Thickness Outer/Inner/Outer (mil) | Wt. % mica | Final Pressed Thickness (mils) | PDIV (Volts) | PDIV/mil (Volts/mil) | Tensile Strength (lbf) | Taber Abrasion (g) |
| --- | --- | --- | --- | --- | --- | --- | --- |
| 1 | 2/4/2 | 28.1 | 7.69 | 1090 | 142 | 33.8 | 0.15 |
| A | 3/0/3 | 0 | 5.93 | 735 | 124 | 61.87 | 0.19 |
| B | 3/3/3 | 0 | 8.54 | 846 | 99 | 93.39 | 0.09 |
| C | 0/5/0 | 30 | 5.32 | 853 | 160 | 21.45 | >0.40 |
| D | 0/8/0 | 48 | <8 | 984 | 123 | 44.2 | 0.40 |

Example 2

Various samples of aramid paper were made using the of the mica-free layers and mica-containing layers of Example 1. As in Example 1, the aramid paper consisted of two outer mica-free layers having a single mica-containing inner layer sandwiched between those two outer layers. The samples of the aramid papers were made as in Example 1 by laying up the various layers by hand and consolidating the three layers together in a heated static press operating at a surface temperature of 280° C. and pressing the layers together at a pressure of 500 psi. The specific samples and the properties of the resulting 3-layer papers are summarized in Table 1. Also shown in Table 2, for illustration, is the data for Sample C from Example 1, which was a paper made with only one thick mica-containing layer and having no mica-free layers.

TABLE 2

| Item | Starting Layer Thickness Outer/Inner/Outer (mil) | Wt. % mica | Final Pressed Thickness (mils) | PDIV (Volts) | PDIV/mil (Volts/mil) | Tensile Strength (lbf) |
| --- | --- | --- | --- | --- | --- | --- |
| 2 | 2/3/2 | 26.2 | 6.98 | 756 | 108 | 38.52 |
| 3 | 2/6/2 | 34.3 | 9.72 | 1182 | 122 | 44.9 |

TABLE 2-continued

| Item | Starting Layer Thickness Outer/Inner/Outer (mil) | Wt. % mica | Final Pressed Thickness (mils) | PDIV (Volts) | PDIV/mil (Volts/mil) | Tensile Strength (lbf) |
| --- | --- | --- | --- | --- | --- | --- |
| 4 | 2/9/2 | 38.3 | 12.23 | 938 | 77 | 76.62 |
| 5 | 3/3/3 | 20.8 | 8.81 | 806 | 91 | 49.22 |
| 6 | 3/6/3 | 29.3 | 11.44 | 919 | 80 | 87.18 |
| C | 0/5/0 | 30 | 5.32 | 853 | 160 | 21.45 |

Example 3

A sample of aramid paper having the composition of Item 3 from Table 2, consisting on two outer mica-free layers having a single mica-containing inner layer sandwiched between those two outer layers, was made as before; however, the individual layers were supplied from individual rolls and combined and then consolidated together in a continuous process in a nip between heated calender rolls operating at a surface temperature of 280° C. and pressing the layers together at a pressure of 1300 pounds per linear inch to consolidate the three layers to a thickness of about 0.0102 inches (10.2 mils). The PDIV of the aramid paper was 1327 volts, which was an equivalent PDIV/mil of 130 volts per mil, and the tensile strength was 98.6 lbf.

Reference Example

This example illustrates the negative effect the addition of mica can have on the mechanical properties of aramid sheets. Single layer mica-free aramid handsheets and mica-containing aramid handsheets were made to illustrate the effects that the addition of mica has on sheet properties. Aqueous dispersions were made as described in Example 1 and then individual handsheet samples were made using a handsheet mold. Each aqueous dispersion was poured with 8 liters of water into a 21×21 cm handsheet mold and five wet-laid papers R-0, R-20, R-30, R-40, & R-50 were formed, with Item R-0 having no mica content. The handsheets were then individually placed between two pieces of blotting paper, hand couched with a rolling pin, and dried in a handsheet dryer at 150° C. for 10 minutes. The ultimate compositions of the handsheets varied from 0-50% weight percent mica, 37-65 weight percent MPD-1 fibrids, and 13-35 weight percent aramid floc as shown in Table 3. The initial unconsolidated thickness of all the handsheets before pressing in the static press was a nominal 0.005 inches (5 mils).

As shown in Table 3, the addition of mica, while improving the partial discharge initiation voltage of the handsheets, has a tremendous negative effect on the mechanical properties of the sheets, most notably the tensile strength of traditional mica-containing aramid handsheets.

TABLE 3

| Item | Wt. % Mica | Final Pressed Thickness (mils) | PDIV (Volts) | PDIV/mil (Volts/mil) | Tensile Strength (lbf) |
| --- | --- | --- | --- | --- | --- |
| R-0 | 0 | 5.45 | 853 | 157 | 41.14 |
| R-20 | 20 | 5.13 | 877 | 171 | 24.27 |
| R-30 | 30 | 5.32 | 853 | 160 | 21.45 |
| R-40 | 40 | 5.25 | 865 | 165 | 16.96 |
| R-50 | 50 | 4.88 | 925 | 190 | 12.19 |

We claim:

1. An aramid paper suitable for use as electrical insulation, comprising:
   a) a first outer layer comprising 70 to 30 weight percent aramid floc and 30 to 70 weight percent aramid fibrids, the first outer layer being free of mica and having a first face and a second face;
   b) an inner layer comprising 50 to 70 weight percent aramid material comprising fibrids and 30 to 50 weight percent mica, the inner layer having a first face and a second face; and
   c) a second outer layer comprising 70 to 30 weight percent aramid floc and 30 to 70 weight percent aramid fibrids the second outer layer being free of mica and having a first face and a second face;
   wherein the first face of the first outer layer is a first outer face of the aramid paper, and the second face of the first outer layer is coextensive with and bound face-to-face with the first face of the inner layer solely by fibrids in the first outer layer and the inner layer; and
   wherein the first face of the second outer layer is coextensive with and bound face-to-face with the second face of the inner layer solely by fibrids in the second outer layer and the inner layer, and the second face of the second outer layer is a second outer face of the aramid paper;
   wherein the aramid paper has a total of 25 to 40 weight percent mica.

2. The aramid paper of claim 1, wherein the aramid material of the inner layer is a combination of less than 50 weight percent aramid floc and greater than 50 weight percent aramid fibrids.

3. The aramid paper of claim 2 having 15 to 45 weight percent floc and 55 to 85 weight percent fibrids.

4. The aramid paper of claim 1 wherein each of the first and second outer layers has a thickness of 0.001 to 0.003 inches.

5. The aramid paper of claim 4 wherein each of the first and second outer layers has a thickness of 0.0015 to 0.002 inches.

6. The aramid paper of claim 1 wherein the inner layer has a thickness of 0.002 to 0.010 inches.

7. The aramid paper of claim 6 wherein each of the inner layer has a thickness of 0.004 to 0.006 inches.

8. The aramid paper of claim 1 having a total thickness of 0.004 to 0.016 inches.

9. The aramid paper of claim 8 having a total thickness of 0.007 to 0.012 inches.

10. The aramid paper of claim 9 having a total thickness of 0.008 to 0.010 inches.

11. The aramid paper of claim 8 having a total thickness of 0.004 to 0.007 inches.

12. The aramid paper of claim 1 wherein the aramid paper, when subjected to a Taber abrasion measurement after 125 cycles using 1000 g weights on each of the arms, has a weight loss in grams that is no more than the weight loss of a similarly tested mica-free aramid paper of the same thickness.

* * * * *